United States Patent Office 3,350,614
Patented Oct. 31, 1967

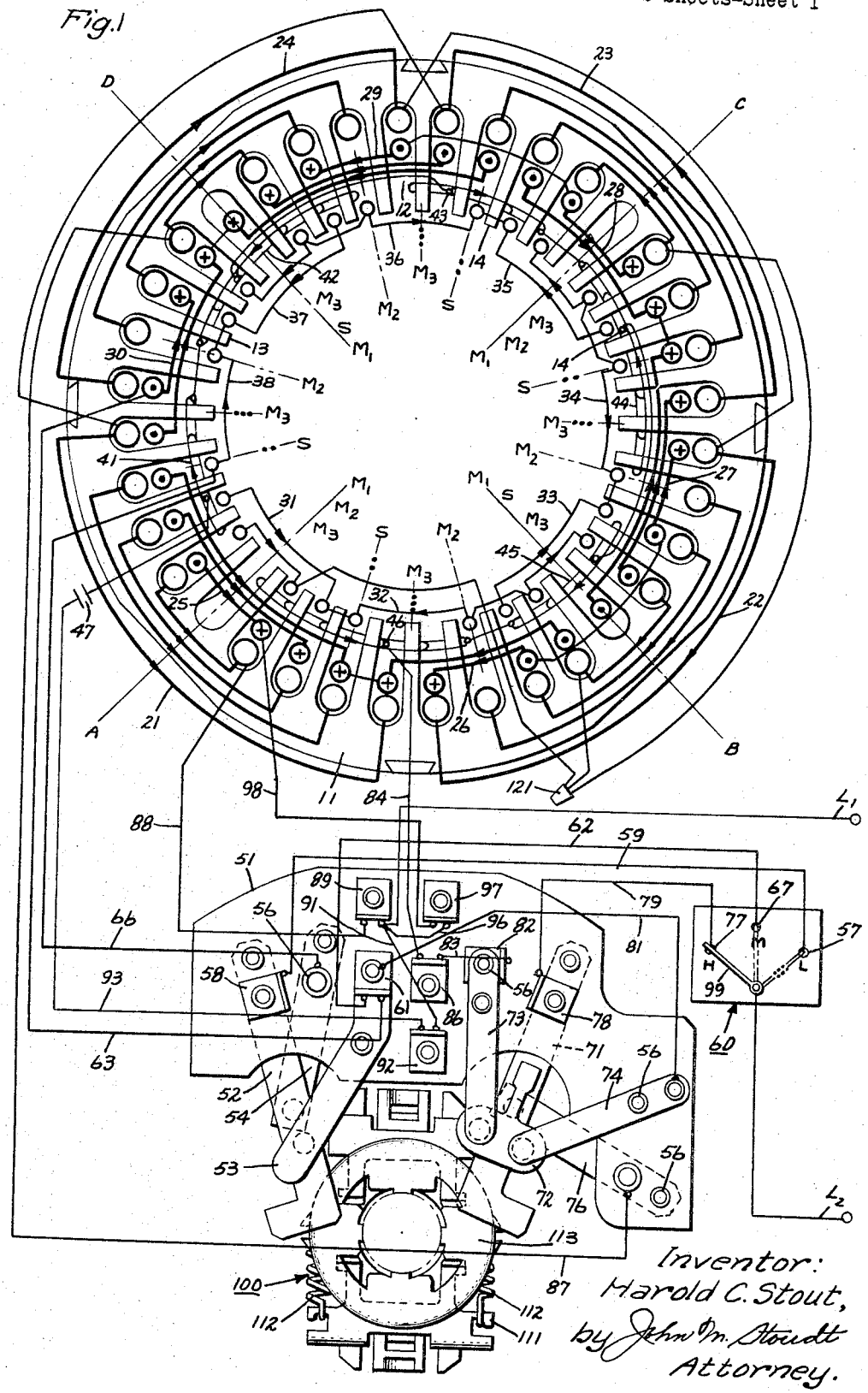

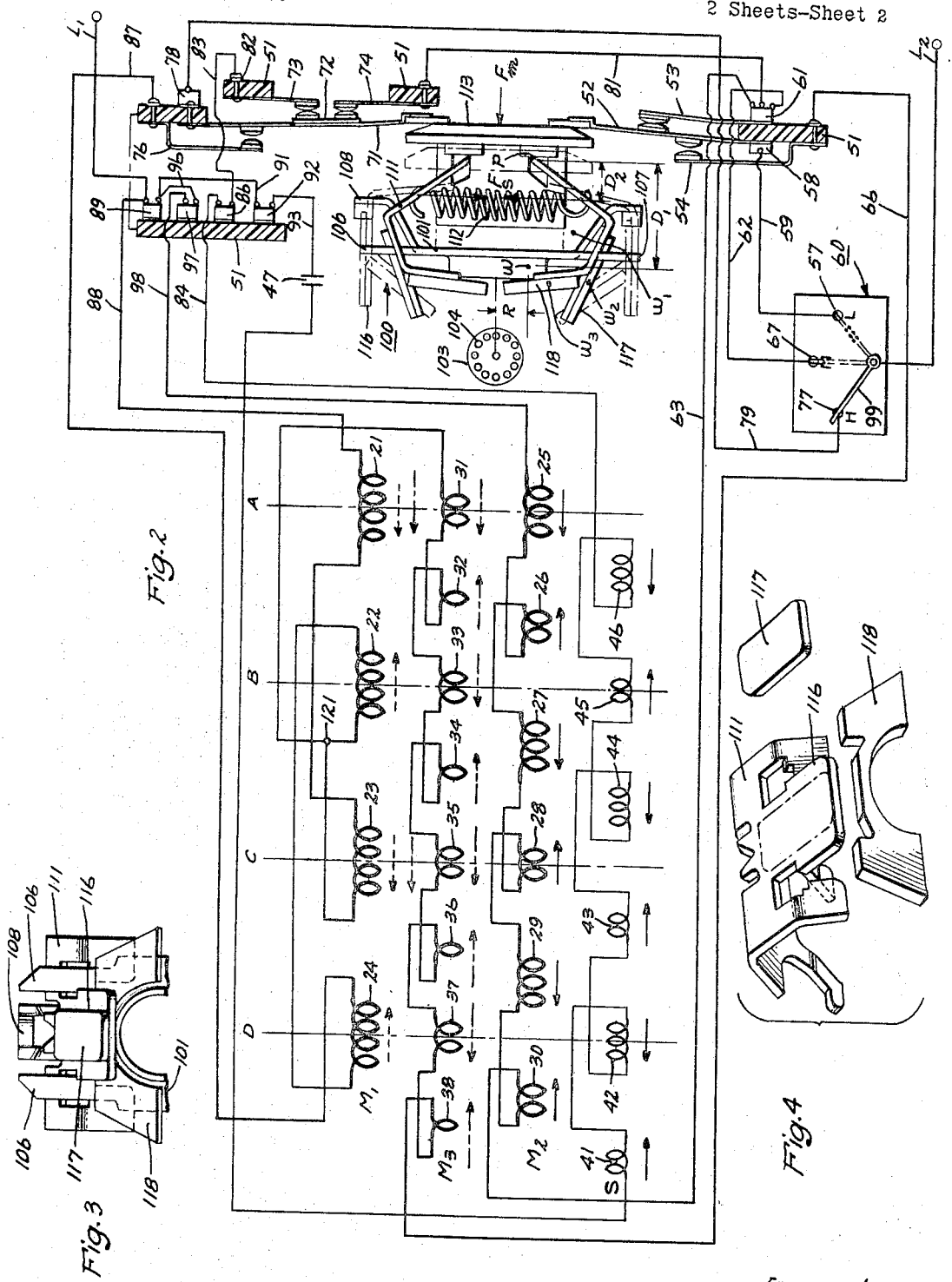

3,350,614
MULTISPEED INDUCTION TYPE
ELECTRIC MOTOR
Harold C. Stout, De Kalb, Ill., assignor to General
Electric Company, a corporation of New York
Filed Sept. 13, 1965, Ser. No. 486,674
7 Claims. (Cl. 318—224)

This invention relates to alternating current single phase induction type multispeed electric motors, and more particularly, to such motors selectively operative at two or more speeds.

Multispeed electric motors of the alternating current single phase induction type are customarily employed for domestic applications in such equipment as automatic washing machines, dryers, and furnace fans, which require high torques under starting conditions yet place a practical upper limit on the electrical current which may safely be employed to obtain the desired starting torques. In addition, the running performance of the multispeed motors should be satisfactory. The foregoing features are difficult to attain, and at the same time, retain any economy in the mass production manufacture of the inherently expensive multispeed motors. These factors are especially significant for split phase multispeed motors having (1) a start winding of the distributed wound kind energized during starting conditions to obtain high torque, and (2) a speed responsive device to open the circuit of the start winding once the motor has attained a preselected or predetermined speed.

It is therefore an object of the present invention to provide an improved multispeed induction type electric motor, and it is a more specific object to provide the multispeed motor with the desirable features mentioned above.

It is another object of the present invention to provide an improved multispeed alternating current single phase, split phase induction type electric motor having distributed wound main and start windings, which is capable of attaining high starting torque for a given current input and at the same time can effectively utilize relatively inexpensive, standard, centrifugal mechanisms with slight yet significant modifications thereto for de-energizing the start winding once the motor has reached a predetermined speed at a competitively attractive unit cost for the motor.

In carrying out the objects in one form thereof, by way of example, I provide an improved multispeed alternating current single phase, split phase induction type electric motor which is selectively operative at three different running speeds. A plurality of main winding coils are arranged on the stator core of the motor and connected to establish selectively three groups of main magnetic poles $M_1$, $M_2$, and $M_3$. The polar groups are dissimilar from one another in total number of poles to produce the different operative speeds, with the poles $M_1$ being least in number for the high running speed. The core also accommodates a plurality of auxiliary coils physically displaced on the core from certain of the main winding coils energized during starting to establish auxiliary poles S which provide a space phase in the respective currents of the energized coil pluralities under starting conditions. Displacement in time phase or phase angle may be obtained in any suitable way; e.g., difference in resistance between the two coil pluralities or the provision of a capacitor in series with the coils forming the auxiliary poles.

Coil excitation control means, including suitable speed responsive switch means and speed selector switch means, control the selective energization of the main winding coil pluralities and of the auxiliary coil plurality such that the coils forming one of the main magnetic poles in excess of poles $M_1$, for instance, intermediate number of poles $M_2$, are always connected in parallel with the auxiliary coils below a predetermined speed during starting conditions to develop high starting torque for a given energy input. At the predetermined speed, the auxiliary coils are deenergized by operation of a speed responsive centrifugal mechanism which actuates the speed responsive switch means, and a selected group of main magnetic poles are established to produce the desired running speed. The centrifugal mechanism has a weight system and certain other components selected to provide a nominal rotational cut-out or operating speed preferably in the neighborhood of 75% of the running speed produced by the same main poles energized during starting.

With regard to the main magnetic poles, by energizing some of the same main winding coils for at least two of the selective running speeds, a savings in material is permitted. Further, assuming coils of at least two poles are excited of poles $M_1$ and $M_3$ for two operative conditions, by furnishing a total number of poles such that the quotient of the polar ratio $M_3/M_1$ is an integer, an unusually large economy of coil material may be realized since more than one pole of each group may be concurrently excited without need for a current reversing switch.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawings where:

FIGURE 1 is a partial schematic presentation of the stator including the winding distribution speed responsive devices, and circuitry for an alternating current single phase, split phase induction type electric motor incorporating the preferred embodiment of the present invention;

FIGURE 2 is a partial schematic diagram of the electric motor of FIGURE 1 showing the motor components under starting conditions for one selected speed of operation;

FIGURE 3 is a rear view of a part of the centrifugal mechanism seen in the first two figures; and FIGURE 4 is an exploded view of one of the centrifugal weight systems for the illustrated centrifugal mechanism of the exemplification.

Turning now to the drawings in more detail, for purposes of explanation I have shown the preferred embodiment of my invention in connection with an alternating current multispeed single phase, split phase induction type electric motor which is selectively operative at three different running speeds. In the exemplification, the motor includes a laminated stator core 11 shown in FIGURE 1 conventionally formed with thirty-six identical coil accommodating slots 12 and a central rotor receiving bore 13 defined by stator teeth sections 14 in the usual way. A number of distributed wound main field winding coils are arranged on the core in coil pluralities 21–38 inclusive of concentric coils individually formed by turns of insulated wire and connected such that certain selectively energized coil plurality combinations to be described in more detail hereinafter, form three separate and distinct groups of magnetic main poles $M_1$, $M_2$, and $M_3$ respectively. For convenience of presentation the character references $M_1$, $M_2$, and $M_3$ identifying the three groups of main poles in FIGURE 1 are placed along radial lines denoting the centers for the respective magnetic main poles.

In order to provide three different running speeds of operation, the three polar groups $M_1$, $M_2$, and $M_3$ differ in the total number of poles produced: four, six and eight poles respectively being illustrated for high, medium, and low speeds of running operation. Moreover, only a single selected polar group established at any one time to produce a given running condition, with adjacent poles in the single selected group having opposite instantaneous polarities as indicated by the arrows in FIGURES 1 and 2, which for purposes of illustration depict assumed directions of current flow through the individual coils of the various coil pluralities.

For starting the multispeed motor, regardless of the chosen running speed, the stator core also carries distributed wound coil pluralities 41–46 inclusive of concentrically arranged and serially connected coils, also formed of turns of insulated wire, to establish a group of magnetic auxiliary or start poles S corresponding in total number to a number of main poles in excess of poles $M_1$; e.g., the six main poles $M_2$ formed by coil pluralities 25–30 in the illustrated embodiment. These auxiliary coil pluralities are accommodated by the core in spaced relation to main coil pluralities 25–30 to create a space phase in the currents of the respective pluralities. A displacement in time phase may be obtained in any suitable way such as a resistance dissimilarity or by the capacitor 47 in series with the auxiliary coils as in capacitor start motors.

Below a predetermined speed to be discussed hereinafter, main poles $M_2$ are established in parallel with auxiliary poles S to generate unusually high starting torque for a given power or current input until the predetermined speed is attained. At that time, at least the coils forming the group of auxiliary poles S are de-energized by coil excitation control means and the main winding coil pluralities establishing the single selected group of main magnetic poles are energized to produce the desired running speed.

To accomplish this, a speed responsive arrangement including a suitable speed responsive switch means operative at the predetermined speed and a pole changing or speed selector switch 60 are furnished. In the illustrated exemplification best revealed in FIGURE 1, the speed responsive switch means has two sets of cooperating contact elements mounted to a switch mounting and terminal board assembly which includes a support member 51 fabricated of insulating material, such as fiber board, which in turn may be secured in the desired position within the motor frame (not shown) in any convenient way, such as that disclosed in the R. E. Seely Patent No. 3,157,752 issued Nov. 17, 1964. One set of the contact elements has an electrically conductive movable switch blade 52 provided with a contact on opposite faces of the blade (FIGURE 2) for alternate engagement with contacts of spaced apart electrically conductive start and run blades 53, 54.

Each of the contact blade elements is rigidly fastened at one end onto insulating member 51 by a pair of spaced apart rivets 56 or the like to provide a sturdy cantilever support which permits the free end of the individual blades to extend beyond the edge of the insulating member 51, with movable contact element 52 being normally biased into engagement with run blade 54. The movable element 52 is connected in series circuit with the low speed stationary contact post 57 of speed selector switch 60 by an upright L-shaped terminal post 58, attached to blade 52 at one of the rivet locations, and conductor 59. The start blade also has an L-shaped terminal post 61 connected to it at one of its rivets which is employed as a common terminal to place a side of coil pluralities 25–30 forming main poles $M_2$ in circuit with the medium speed stationary contact post 67 of the speed selector switch 60 by conductors 62, 63 as well as to connect the start blades in circuit with one another via conductor 81. Run blade 54 of the first set is in circuit with one side of the coil pluralities forming main magnetic poles $M_3$.

The second set of cooperating contact elements of the speed responsive switch means is comprised of an electrically conductive movable switch blade 71 carrying a T-shaped conductive piece 72 having transversely spaced apart contacts for concurrent engagement with spaced apart start blades 73 and 74. On the planar surface of the movable blade 71 facing away from blades 73, 74 is provided a contact for alternate engagement with a contact of a run blade element 76. These elements are supported by insulating member 51 in the same manner as the first set of blade elements already described. Movable blade 71 of the second set is electrically attached to the high speed stationary contact post 77 of the speed selector switch 60 through L-shaped terminal post 78 and conductor 79. One of the start blades 74 is in series by conductor 81 with start blade 53 of the first set of switch elements while start blade 73 is placed in circuit with one side of the auxiliary plurality of coils 41–46 inclusive forming the auxiliary poles S by a terminal 82 attached to the blade, conductors 83 and 84, and an L-shaped terminal post 86 mounted on insulating member 51 which is common to conductors 83, 84. With reference to run contact element 76, it is connected to one side of the coil pluralities which form the high speed main magnetic poles $M_1$.

With respect to the other sides of coil pluralities, they are connectable to one side of a suitable power source of alternating current (e.g., 60 cycle, not shown) through input line $L_1$ attached to input terminal post 89, which serves as a common terminal for one side of all of the coil pluralities. As will be seen more clearly hereinafter, conductor 88 is employed to connect the coils establishing main poles $M_1$ and $M_3$ directly to post 89 while the main coil pluralities 25–30 are attached to it by way of terminal post 97, and conductors 96, 98. The one side of the auxiliary core pluralities 41–46 and capacitor 47 are connected in circuit with post 89 via terminal post 92 and conductors 91, 93. Rotatable arm 99 of the rotary switch 60 and the speed responsive means selectively connect the other side of the power source by way of line $L_2$ which may contain a standard "off-on" single pole power switch (not shown) in it to complete the circuit to arm 99.

Before considering the preferred speed responsive mechanism, generally indicated at 100 in FIGURES 1 and 2, employed to actuate movable blade elements 52 and 71 in unison of the illustrated speed responsive at the predetermined speed, operation of the multispeed motor of the exemplification will be outlined. For purposes of explanation, it will be assumed that the desired running speed is the high speed produced by the four magnetic main poles $M_1$ at and above the predetermined speed. Thus, before operation is initiated, arm 99 of the speed selector switch 60 is manually turned into contact with stationary contact post 77, the high speed position "H" shown by the solid lines and the "Off-On" switch is then closed to start operation.

As will now be explained, main pluralities 25–30 inclusive and auxiliary coil pluralities 41–46 will be energized in parallel between "live" terminal posts 89 and 78 to establish the six main and auxiliary magnetic poles $M_2$ and S. It should be noted that post 89 is directly in circuit with line $L_1$ while post 78 is connected to line $L_2$ through speed selector switch 60 and conductor 79. It will be recalled that one side or both of the coil pluralities 25–30 and 41–46 are in circuit with input terminal post 89. The other side of these coil pluralities complete a closed electrical path to post 78 through the speed responsive switch means which has movable blade elements 52, 71 held into engagement with the associated start blade elements 53, 73 and 74 by mechanism 100, the run contact blades being in open circuit. The assumed relative current flow through these coil pluralities is shown in FIGURES 1 and 2 by the solid arrows and in regard to the coils of main pluralities 25–30, by standard symbols ⊙ and ⊕ in FIGURE 1 denoting directions of current flow respectively toward and away from the viewer.

It will be appreciated from the disclosure of FIGURES 1 and 2 that regardless of the ultimate running speed desired as determined by speed selector switch 60, the two coil pluralities, which establish magnetic polar groups $M_2$ and S, will always be connected in parallel for starting conditions. In particular, if arm 99 is placed in either of the broken line positions "M" or "L" to select the medium or low running speeds resulting from main polar groups $M_2$ and $M_3$ respectively, then coil pluralities 25–30 and 41–46 are connected in parallel between input terminal post 89 and post 61, rather than common post 78. The sides of these coil pluralities in circuit with input post 89 has already been discussed. Taking the other side of the coil pluralities, under starting conditions a completed circuit for pluralities 25–30 is made directly with post 61 by conductor 63 while auxiliary coil pluralities 41–46 have a closed electrical path with post 61 as follows: conductor 84 to terminal post 86, conductor 83 to post 82, through the second set of speed responsive switch elements 73, 72, and 74 to conductor 81 and post 61. The circuit between post 61 and the medium speed post 67 of switch 60 is completed through conductor 62. The low speed circuit from post 61 to contact switch post 57, passes through the engaging start and movable elements, terminal 58 and conductor 59.

Consequently, it will be seen that regardless of the position of arm 99 of the speed selector switch and the ultimate running speed which is selected or desired, the same main and auxiliary coil pluralities will always be excited below the predetermined speed to form the six main and auxiliary coil poles.

Once the motor reaches a predetermined speed, the movable blade elements 52, 71 of the speed responsive switch means are concurrently transferred away from engagement with their associated start elements 53, 73, 74 and into closed circuit with run contact blade elements 54, 76. Various aspects of mechanism 100 which actuates the movable elements 52, 71 in the illustrated exemplification are shown in FIGURES 1–4 inclusive. Mechanism 100 is of the centrifugally operated type and comprises a support plate 101 fabricated from steel or other rigid material having a central hub 102 suitably attached to revolve with the shaft of a standard rotor assembly. As schematically seen in FIGURE 2, the rotor assembly includes a magnetic core 103 and a secondary squirrel cage winding 104. The support plate 101 serves to pivotally mount a pair of identical centrifugal weight members 111 in diametrically opposed positions relative to the axis of the mechanism by two radially spaced apart pairs of ears 106, 107 and a central section 108, bent both axially and radially, furnished between the ears. The members are pivotally connected to push-collar 113 at "P" to effect normal displacement of the collar to the extended position during starting conditions. A pair of coil springs 112, attached at each end to the centrifugal weight members 111, bias members toward each other and hence, collar 113 with a force $F_s$ having a greater magnitude than the force $F_m$ resulting from blade elements 52, 71 acting on the collar toward its retracted position shown by the broken lines in FIGURE 2. Springs 112 when attached to the opposed weight members 111, retain the mechanism components in an assembled relation. The mechanism described so far is of conventional construction and is typical of the kind used in certain single phase, electric motors which are started and run on four pole operation.

In order to derive maximum benefit of my invention in regard to the illustrated motor, the speed at which the centrifugal force exerted by the weight the centrifugal force exerted by the weight system of the mechanism which overcomes the opposing force of the springs 112 and causes the centrifugal weights to move radially outwardly on the support plate in a pivotal movement, is preferably 75% of the synchronous speed for the polar operation of the six main winding poles $M_2$, the group of poles established during start. Since a synchronous speed for six pole operation is theoretically 1200 r.p.m., the predetermined speed of operation for mechanism 100 should be a nominal 900 r.p.m.±8%.

The interrelationships of the components for mechanism 100 and the speed responsive switch means, which provide the desired predetermined speed or so-called "cutout" speed for mechanism 100, are shown by the following equation or expression taken in connection with FIGURE 2:

$$N\sqrt{\frac{2F_sD_2}{KWRD_1}}-F_m$$

where:

$N$ = predetermined cut-out speed in r.p.m.
$F_s$ = force of each spring 112 at predetermined speed
$W$ = weight in grams of centrifugal weight system
$R$ = perpendicular distance in inches from axis of rotation to center of gravity for W at standstill or zero speed
$D_1$ = distance in inches from pivot point "P" of member 111 to W at standstill
$D_2$ = distance in inches from "P" to spring hook of spring 112 at standstill
$K$ = .615×10$^{-7}$ unit factor
$F_m$ = force acting on collar 113 measured in r.p.m. resulting from the speed responsive switch means (blades 52, 71 biased toward the run blades 54, 76)

Applying this expression to the components of mechanism 100 already described and to the desired 900 r.p.m. of the above example, it is necessary to change the center of gravity of the centrifugal weight system from location $W_1$ to W as shown in FIGURE 2. This may readily be accomplished while at the same time augmenting the structural strength of the weight system, by securing a transverse weight member 118 (FIGURES 3 and 4) having a center of gravity at $W_3$ (FIGURE 2) to each of members 111 in a plane normal to the axis. Another weight member 117 is also added to each member 111 by attachment onto platform 116 as by welding or the like to furnish a center of gravity at $W_2$. In this way, the total weight W of the centrifugal weight system (the summation of $W_1$, $W_2$, $W_3$) and the location R of its center of gravity from the axis can be easily regulated by merely changing the weight system. This change also affects dimension $D_1$ in the equation. Thus, the centrifugal weight system as well as the spring forces $F_s$, $F_m$ may be varied to control the desired cut-out speed. However, spring 112 should be chosen such that they provide a force $F_s$ of sufficient magnitude to retain the parts in assembled relation and function to force collar 113 into its extended position under starting conditions.

In actual practice, a cut-out speed of 909 was provided for the motor of the exemplification in the following way: weight $W_1$=11 grams, weight $W_2$=2.5 grams, weight $W_3$=6.8 grams to furnish a resultant W of 20.3 grams at a radius R of 0.562 inch; $D_1$=0.078 inch; $D_2$=0.306 inch; $F_s$=1.1 pound; and $F_m$=200 r.p.m.

Returning once again to a consideration of the operation of the motor, it will be assumed that the motor has been started with switch 60 selecting the high running speed (four-pole operation). Once the predetermined speed has been attained and the push collar 113 is caused to move to its retracted position (broken lines in FIGURE 2) relieving the pressure on the movable switch elements 52, 71, the bias of these elements will pivot them into engagement with run blade elements 54, 76 and place the start contacts in open circuit to de-energize coil pluralities 25–30 and 41–46. At the same time, coil pluralities 21–24, which establish four main magnetic pole groups $M_1$, will be excited between terminal posts 89 on the one side and post 78 on the other. In particular, conductor 88 connects post 89 directly to one side of the winding plurality 21 while the other side is in closed circuit with the run blade element 76, movable blade element 71, and post 78.

If, on the other hand, the medium speed is selected by speed selector switch 60 for run operation, position M, then once the auxiliary coil pluralities 41–46 have been de-energized, main coil pluralities 25–30 generating the six main poles $M_2$ will be excited between input post 89 and post 61. The circuit includes the following: conductor 96, post 97, conductor 98, on the one side and conductor 63 on the other.

With respect to low running speed operation, provided by the eight main pole groups $M_3$, it will be seen that some of the same coil pluralities employed to produce main winding pole groups $M_1$ are also excited to assist in creating certain pole groups of $M_3$. More specifically, as shown in FIGURE 1, coil pluralities 21–24 inclusive have radial centers respectively at the lettered locations A, B, C, and D.

Main coil pluralities 21 and 23 of poles $M_1$ are connected at 121 in series with main coil pluralities 31–38 such that the currents pass through pairs of pluralities 21, 31 and 23, 35 having common centers in the same direction as indicated by the arrows both in FIGURES 1 and 2 when pole groups $M_3$ are established. This relation permits a reduction in total coil turns (material) needed for the eight pole operation. So long as the quotient ratio of the number of poles $M_3/M_1$ is an integer (e.g., $8/4=2$), no current reversing switch means is required to attain this end and coils of at least two groups of poles may be excited for more than one speed of operation. Of course, if desired, either coil plurality 21 or 31 or both could be serially connected in circuit with coil plurality 25 of pluralities 25–30 to establish main winding poles $M_2$ thereby requiring even less material. The circuit for low speed run operation (eight poles, $M_3$) is completed between input post 89 and post 57 of switch 60 when arm 99 is in the "L" position by conductors 88, 66, run blade 54, and movable blade 52.

Reverse rotation of the motor at any speed may be furnished merely by interchanging conductors 91, 83, that is, extending conductor 91 to post 86 and conductor 38 to post 92 thereby reversing current flow through the main coil pluralities.

The following example is given in order to illustrate more clearly how the invention, as described above, has been satisfactorily carried out in actual practice. The motor was a single phase multispeed motor rated at ½-h.p., 115 volts, and full load running speeds of 1725 r.p.m., 1140 r.p.m., and 850 r.p.m. at currents of 7.2/8.7/7.0 amps. The example motor incorporated centrifugal mechanism 100 and winding excitation control means having the two sets of speed responsive switches and speed selector switch 60 constructed as illustrated and described. The coil plurality distribution was also as revealed in the drawings, having the following turn distribution:

| Coil Pluralities | Turns per Coil | | | Wire (copper) Diameter in inches |
|---|---|---|---|---|
| | Outermost Coil | Intermediate Coil or Coils | Innermost Coil | |
| 21–24 inclusive | 25 | 15, 11 | 11 | .0403 |
| 25, 27, 29 | 33 | 26 | 16 | .0359 |
| 26, 28, 30 | 26 | | 16 | .0359 |
| 31, 35 | 25 | | 17 | .0359 |
| 32, 34, 36, 38 | 25 | | | .0359 |
| 33, 37 | 35 | | 25 | .0359 |
| 41, 43, 45 | 36 | | 21 | .0179 |
| 42, 44, 46 | 45 | 36 | 26 | .0179 |

During starting, the motor generated 44 oz. ft. of output torque, with a current input of 23 amps. at 115 volts. The nominal running speed full load output was 24.4 oz. ft. In addition, capacitor 47 had a lower voltage rating than would otherwise have been required, for instance, 110-volt rating vs. the customary 160-volt rating, thereby resulting in a lower cost capacitor. Furthermore, during starting the current phase angle between the excited main and auxiliary coil pluralities is less critical in a motor employing my invention as contrasted with one that does not.

It will be apparent from the foregoing that while I have described the preferred embodiment as applied to a three-speed motor having four, six, and eight selective runing poles, the principles of my invention enunciated above are equally applicable to other multispeed motors having more than one operating speed and a high speed established by two or more poles. In addition, among other things, the illustrated winding coil circuit controlling components, such as the various switches and mechanism 100, are by way of exemplification. Consequently, while I have shown and described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a multispeed electric motor having a stator core and being selectively operative at three speeds, a plurality of main winding coils arranged on the stator core and connected to form selectively three groups of magnetic main poles $M_1$, $M_2$, and $M_3$, with each group of poles differing in total number to produce different speeds of operation, and with pole $M_1$ being least in number to produce a high running speed of operation for the motor; a plurality of auxiliary winding coils accommodated on the stator core and connected to form a group of magnetic starting poles S corresponding in number to one predetermined group of the main poles other than poles $M_1$; coil excitation control means including speed responsive switch means having first and second sets of switch contacts and speed selector switch means connected in circuit with said pluralities of winding coils for controlling the selective energization of said main winding coils and said auxiliary winding coils; said first and second sets of switch contacts of the speed responsive switch means each including at least one start contact and a run contact in spaced relation, with a movable contact supported therebetween alternately engageable therewith in response to predetermined speed of the motor, and a speed responsive device in actuating relation with said movable contacts, said coil excitation control means and pluralities of coils being connected such that the main coils forming said predetermined group of main magnetic poles having a number in excess of poles $M_1$ and said auxiliary winding coils are always connected in parallel relation when said movable contacts are in engagement with their associated start contacts thereby developing high starting torque for a given energy input to the energized coils.

2. In a multispeed electric motor having a stator core and being selectively operative at three speeds, a plurality of main winding coils arranged on the stator core and connected to form selectively three groups of magnetic main poles $M_1$, $M_2$, and $M_3$, with each group of poles differing in total number to produce different speeds of operation, and with poles $M_1$ being least in number to produce a high running speed of operation for the motor; a plurality of auxiliary winding coils accommodated on the stator core and connected to form a set of magnetic starting poles S in excess of main poles $M_1$; speed responsive switch means and speed selector switch means having three separate contact posts for controlling the selective energization of said main winding coils and said auxiliary winding coils; said speed responsive switch means including first and second sets of contacts having at least one of start contact and a run contact in spaced relation to one another and a movable contact supported to move between said run and start contacts; one start contact of said first set of contacts being in series circuit with the coils forming the group of starting poles S, and with the movable contact of said first set of contacts being in series with one of said contact posts of said speed selector switch means; said second set of contacts having the run contact connected in series circuit to the main winding coils forming the group of poles $M_3$ and the movable contact of said second set of contacts connected to another contact post of said speed selector switch means; the start contact of said second set of contacts being connected in circuit with the start contact of said first set of contacts, with another contact post of said speed selector switch means and with the main winding coils producing poles $M_2$; and a speed responsive device for concurrently actuating said movable contacts of said responsive switch means, whereby under all starting conditions of the motor, said movable contacts are engageable with the associated start contacts and said switch means energize said main coils forming a group of poles other than poles $M_1$ and auxiliary coils forming poles S thereby to develop a high starting torque for a given energy input.

3. In a multispeed electric motor having a stator core and being selectively operative at two or more running speeds, a plurality of distributed wound main winding coils accommodated on the core to form selectively at least first and second groups of main magnetic poles, with the first group of poles being greater in total number than the second group when predetermined coils of said plurality of main winding coils are energized to produce at least two running speeds of operation; a plurality of auxiliary coils accommodated on the core to form a group of auxiliary magnetic poles in excess of the number of said first main magnetic polar group; and coil excitation control means including speed responsive switch means connected in circuit with said main and auxiliary coils for controlling the selective energization of the main winding coils respectively forming the first and second groups of main magnetic poles and the auxiliary winding coils; said coil excitation control means connecting the main winding coils forming said second group of main magnetic poles and the auxiliary winding coils in parallel for all starting conditions, and inactivating at least the auxiliary winding coils after the motor attains a preselected speed of rotation, whereby the motor is capable of generating high starting torque for a given energy input independent of the selected running speed.

4. The multispeed motor of claim 3 in which said speed responsive means includes at least one switch means and a centrifugal mechanism; said mechanism having a rotatable element movable between starting and running positions, spring means biasing said element with a predetermined force $F_s$ toward the starting position, and a centrifugal weight system W having a center of gravity located predetermined linear distance R from the axis of rotation of said element; said switch means applying a force $F_m$ to said element toward the running position; the values of W, $F_s$, $F_m$, and R being selected to provide a nominal rotational cut-out speed in the neighborhood of 75% of the running speed produced by said second set of main magnetic poles for operating said element from the starting to the running positions to deenergize at least said auxiliary winding coils.

5. The multispeed motor of claim 3 including means for concurrently energizing some of the same main winding coils for at least two of the selective running speeds whereby a savings in coil material is permitted.

6. In a multispeed induction type electric motor selectively operative at two or more speeds, a first plurality of winding coils forming a first group of main magnetic poles having at least two poles of opposing instantaneous polarity to provide one speed of operation when energized; a second plurality of winding coils forming a second group of main magnetic poles having a total number of poles of opposing instantaneous polarities when excited in excess of the number of poles for the first set to produce a lower speed of operation, with the polar centers of at least one predetermined pole of said first and second group of main magnetic poles being near one another and having the same instantaneous polarities; means for concurrently exciting at least some of the same coils in said predetermined main magnetic poles of said first and second groups of poles for at least one of the speeds of operation; a third plurality of winding coils forming a total number of magnetic auxiliary poles of opposing instantaneous polarities in excess of the number of said first group of poles; coil excitation control means including a speed selector switch and speed responsive switch means for selectively energizing certain coils of the coil pluralities during running conditions to provide the desired speed of operation; said coil excitation control means having a speed responsive device in actuating relation with said speed responsive switch means for exciting the winding coils forming the second group of main magnetic poles in parallel with the third plurality of winding coils under all starting conditions of the motor and for inactivating at least said third plurality of coils after the motor attains a preselected speed of rotation whereby the motor is capable of generating high starting torque for a given energy input under starting conditions.

7. In a multispeed induction type electric motor selectively operative at three speeds, a first plurality of winding coils forming at least two main magnetic poles $M_1$ of opposing instantaneous polarity to provide one speed of operation when energized; a second plurality of main winding coils forming a total number of main magnetic poles $M_2$ of opposing instantaneous polarities in excess of poles $M_1$ when excited to produce a lower speed of operation; a third plurality of winding coils forming a total number of main magnetic poles $M_3$ of opposing instantaneous polarities in excess of poles $M_2$ to produce a still lower speed of operation when excited, with the polar centers of two predetermined $M_1$ poles being near a corresponding number of predetermined $M_3$ poles of the same polarity, and with the quotient of the ratio $M_3/M_1$ being an integer; means for concurrently exciting at least some of the same winding coils in each of said predetermined poles $M_1$ for more than one speed of operation to permit a savings in coil material required; a fourth plurality of winding coils forming a number of auxiliary magnetic poles S of opposing instantaneous polarities numerically corresponding to the total number of $M_2$ poles; coil excitation control means including a speed selector switch and speed responsive switch means for selectively energizing certain winding coils of the coil pluralities during running conditions to provide the desired speed of operation; said coil excitation control means having a speed responsive device in actuating relation with said speed responsive switch means for connecting said second and fourth plurality of coils in parallel under all starting conditions of the motor and for inactivating at least the fourth plurality of winding coils after the motor attains a preselected speed of rotation, whereby the motor is capable of generating high starting torque for a given energy input under starting conditions independent of the selected operating speed.

References Cited

UNITED STATES PATENTS

| | | | |
|---|---|---|---|
| 1,961,793 | 6/1934 | Schaefer | 318—224 |
| 2,269,069 | 1/1942 | Werner | 318—224 |
| 2,409,891 | 10/1946 | Packer | 318—224 |
| 3,579,066 | 12/1951 | Codling | 318—224 |
| 3,167,700 | 1/1965 | Neyhouse | 318—224 |

ORIS L. RADER, *Primary Examiner.*

G. Z. RUBINSON, *Assistant Examiner.*